US010636233B2

(12) United States Patent
Glasgow et al.

(10) Patent No.: US 10,636,233 B2
(45) Date of Patent: Apr. 28, 2020

(54) HANDSHAKE AUTHENTICATED CODED LOCKED CONTAINER

(71) Applicant: eBay Inc., San Jose, CA (US)

(72) Inventors: Dane Glasgow, Los Altos, CA (US); Sergio Pinzon Gonzales, Jr., San Jose, CA (US); Ilya Brown, Piedmont, CA (US)

(73) Assignee: eBay Inc., San Jose, CA (US)

( * ) Notice: Subject to any disclaimer, the term of this patent is extended or adjusted under 35 U.S.C. 154(b) by 0 days.

(21) Appl. No.: 16/241,317

(22) Filed: Jan. 7, 2019

(65) Prior Publication Data

US 2019/0156602 A1    May 23, 2019

Related U.S. Application Data

(63) Continuation of application No. 14/320,441, filed on Jun. 30, 2014, now Pat. No. 10,204,465.

(51) Int. Cl.
*G07C 9/00* (2020.01)
*G09C 1/00* (2006.01)

(52) U.S. Cl.
CPC ..... *G07C 9/00174* (2013.01); *G07C 9/00571* (2013.01); *G09C 1/00* (2013.01); *G07C 2009/0092* (2013.01)

(58) Field of Classification Search
CPC .. G07C 9/00658; G07C 3/00; G07C 9/00896; G07C 2209/63; G07C 9/00912; G07C 2009/0092; G06Q 10/083
See application file for complete search history.

(56) References Cited

U.S. PATENT DOCUMENTS

| 5,907,286 | A | * | 5/1999 | Kuma | G07C 9/00142 235/379 |
| 6,260,300 | B1 | * | 7/2001 | Klebes | F41A 17/066 206/317 |
| 7,411,501 | B2 | | 8/2008 | Austin | |
| 8,299,894 | B1 | * | 10/2012 | Semeniuk | 307/10.2 |
| 10,204,465 | B2 | | 2/2019 | Glasgow et al. | |

(Continued)

FOREIGN PATENT DOCUMENTS

| CN | 102869844 A | 1/2013 |
| CN | 106575213 A | 4/2017 |

(Continued)

OTHER PUBLICATIONS

Advisory Action received for U.S. Appl. No. 14/320,441, dated Aug. 14, 2018, 3 pages.

(Continued)

*Primary Examiner* — Thomas D Alunkal
(74) *Attorney, Agent, or Firm* — Shook, Hardy & Bacon LLP

(57) ABSTRACT

A system and method for a handshake authenticated coded locked container are provided. In example embodiments, a digitally encoded lock mechanism that is used by a sender to lock a container before shipping is determined. An access key is received from the recipient that receives the container. An authentication process is performed that determines whether the access key triggers the unlocking of the container. Based on a determination that the access key triggers the unlocking of the container, instructions are provided to unlock the container.

20 Claims, 11 Drawing Sheets

(56) References Cited

U.S. PATENT DOCUMENTS

| | | | |
|---|---|---|---|
| 2001/0049629 A1* | 12/2001 | Freeman | G06K 7/10079 |
| | | | 705/23 |
| 2003/0197591 A1* | 10/2003 | Bates | G06Q 50/28 |
| | | | 340/5.21 |
| 2005/0044906 A1 | 3/2005 | Spielman | |
| 2006/0164235 A1* | 7/2006 | Gounder | E05B 83/02 |
| | | | 340/539.13 |
| 2006/0195909 A1 | 8/2006 | Boswell et al. | |
| 2007/0271596 A1 | 11/2007 | Boubion et al. | |
| 2009/0201198 A1 | 8/2009 | Moudy | |
| 2010/0176919 A1 | 7/2010 | Myers et al. | |
| 2010/0251785 A1* | 10/2010 | Zarei | B65D 90/00 |
| | | | 70/58 |
| 2011/0050390 A1* | 3/2011 | Denison | B60R 25/102 |
| | | | 340/5.51 |
| 2011/0186397 A1 | 8/2011 | Sheikh | |
| 2012/0185363 A1 | 7/2012 | Gilbert | |
| 2012/0313783 A1 | 12/2012 | Yang | |
| 2013/0015950 A1* | 1/2013 | Wip | G06Q 50/28 |
| | | | 340/5.54 |
| 2014/0014008 A1* | 1/2014 | Tompkins | E05G 1/02 |
| | | | 109/23 |
| 2014/0150502 A1 | 6/2014 | Duncan | |
| 2015/0379796 A1 | 12/2015 | Glasgow et al. | |

FOREIGN PATENT DOCUMENTS

| | | |
|---|---|---|
| EP | 2261865 A1 | 12/2010 |
| WO | 2012/034171 A1 | 3/2012 |
| WO | 2016/004019 A1 | 1/2016 |

OTHER PUBLICATIONS

Final Office Action received for U.S. Appl. No. 14/320,441, dated May 17, 2018, 15 pages.
Notice of Allowance received for U.S. Appl. No. 14/320,441, dated Sep. 17, 2018, 5 pages.
PTO Response to Rule 312 Amendment for U.S. Appl. No. 14/320,441, dated Nov. 30, 2018, 2 pages.
Response to Final Office Action filed on Jul. 17, 2018, for U.S. Appl. No. 14/320,441, dated May 17, 2018, 11 pages.
Response to Non-Final Office Action filed on Jan. 18, 2018, for U.S. Appl. No. 14/320,441, dated Sep. 29, 2017, 9 pages.
International Preliminary Report on Patentability received for PCT Patent Application No. PCT/US2015/038520 , dated Jan. 12, 2017, 8 pages.
International Search Report received for PCT Application No. PCT/US2015/038520, dated Sep. 23, 2015, 2 pages.
Written Opinion received for PCT Application No. PCT/US2015/038520, dated Sep. 23, 2015, 6 pages.
Office Action received for Chinese Patent Application No. 201580042897.7, dated Jul. 4, 2018, 8 pages.
Response to Office Action filed on Nov. 19, 2018, for Chinese Patent Application No. 201580042897.7, dated Jul. 4, 2018, 20 pages (Including English Claims).
Extended European Search report received for European Patent Application No. 15815153.0, dated Jan. 29, 2018, 6 pages.
Response to Extended European Search report filed on Aug. 15, 2018, for European Patent Application No. 15815153.0, dated Jan. 29, 2018, 17 pages.
Appeal Brief for Korean Patent Application No. 10-2017-7001966 Filed on Sep. 18, 2018, 18 pages (4 pages of English Translation + 14 pages of Official Copy).
Final Office Action received for Korean Patent Application No. 10-2017-7001966, dated Apr. 5, 2018, 3 pages.
Final Office Action received for Korean Patent Application No. 10-2017-7001966, dated Jun. 18, 2018, 3 pages.
Office Action received for Korean Patent Application No. 10-2017-7001966, dated Oct. 17, 2017, 13 pages (6 pages of English Translation and 7 pages of Official Copy).
Response to Office Action filed on Dec. 18, 2017 for Korean Patent Application No. 10-2017-7001966, dated Oct. 17, 2017, 29 pages (24 pages of Official Copy + 5 pages of English Claims).
Response to Office Action filed on Jun. 5, 2018, for Korean Patent Application No. 10-2017-7001966, dated Apr. 5, 2018, 15 pages (7 pages of English Translation + 8 pages of Official Copy).

* cited by examiner

HANDSHAKE AUTHENTICATED CODED LOCKED CONTAINER

CLAIM OF PRIORITY

This Application is a continuation of U.S. application Ser. No. 14/320,441, filed Jun. 30, 2014, which is hereby incorporated by reference in its entirety.

FIELD

The present disclosure relates generally to shipping, and in a specific example embodiment, to providing a handshake authenticated coded locked container.

BACKGROUND

Conventionally, individuals and businesses may ship items to a recipient using a container, such as a box or envelope. While some of these containers may provide tamper-evident seals, these tamper-evident seals may only indicate that the container may have been opened during a shipping process (e.g., after leaving a sender's location and arriving at a recipient's location). These tamper-evident seals do not secure the container from actually being opened by anyone other than the intended recipient.

BRIEF DESCRIPTION OF DRAWINGS

Various ones of the appended drawings merely illustrate example embodiments of the present invention and cannot be considered as limiting its scope.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for a handshake authenticated coded locked container. In example embodiments, a digitally encoded lock mechanism that is used to lock a container is determined. For example, the digitally encoded lock mechanism may be a code or image that is used to lock or unlock the container. An access key provided by a recipient or a device of the recipient is received. The access key may be provided over a communication network to the recipient or the device of the recipient of the container such that the recipient can use the access key to unlock the container. An authentication process is performed that determines whether the access key triggers the unlocking of the container (e.g., whether the access key matches the digital encoded locking mechanism). The determination process may be performed at the container, at a central server of a security provider system, or at the device of the recipient. In some embodiments, the central server relays the access key to the recipient or the device of the recipient. During the relay process, the central server may store a copy of the digitally encoded lock mechanism that may be used to match against the access key. Based on the access key matching the digitally encoded lock mechanism, instructions to automatically unlock the container are provided. By using example embodiments of the present invention, containers may be secured during a shipping process.

Figure 1:
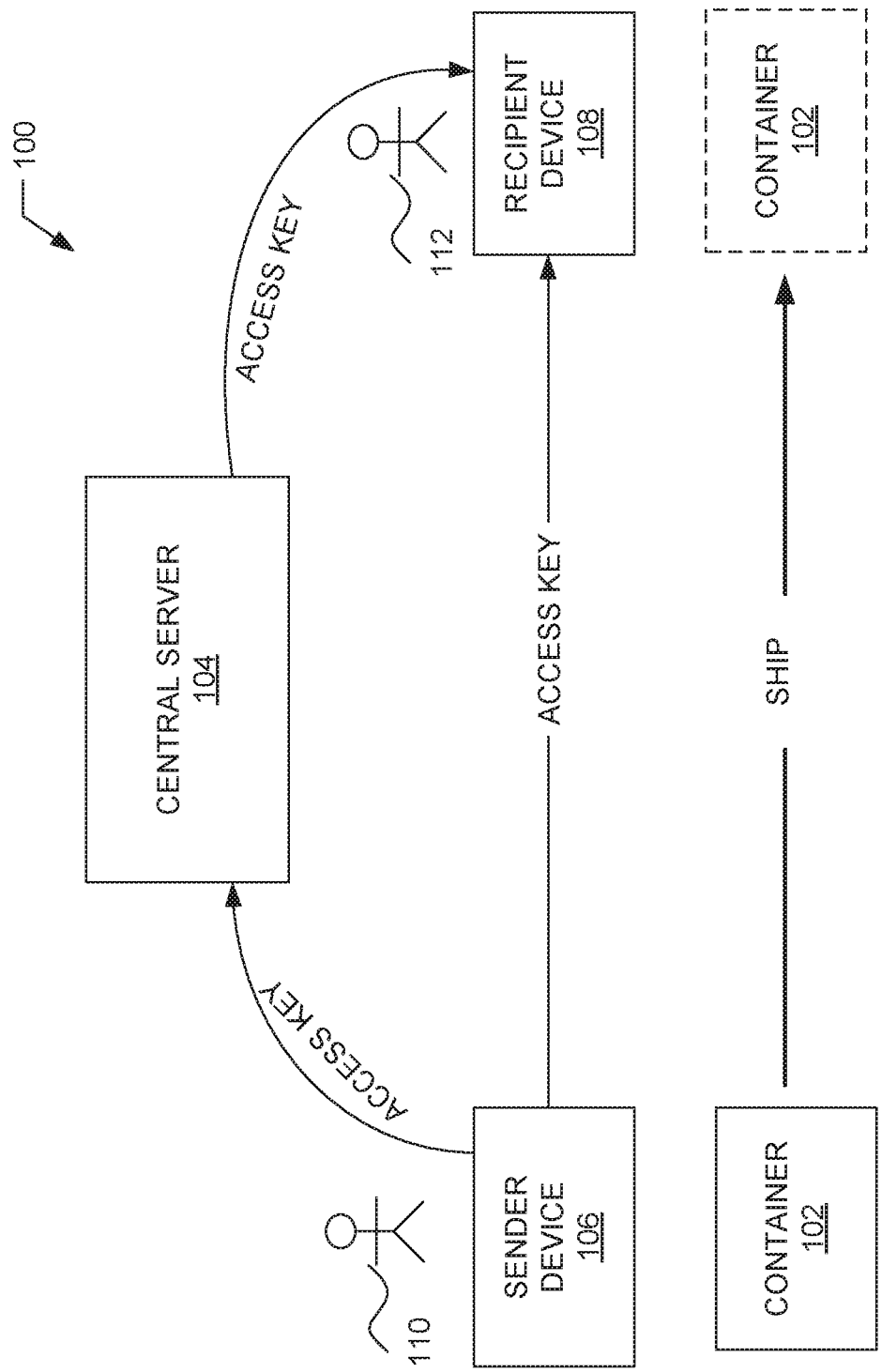
FIG. 1 is a diagram illustrating an example environment in which embodiments of a system for providing a handshake authenticated coded locked container.

With reference to FIG. 1, a diagram illustrating an example environment 100 in which embodiments of a system for providing a handshake authenticated locked container is shown. The environment 100 may comprise a container 102, a central server 104 of a security provider system, a sender device 106, and a recipient device 108. The container 102 may comprise a box, an envelope, a shipping container, or any other housing capable of holding content to be shipped from a sender 110 to a recipient 112. In alternative embodiments, the container 102 may be a vehicle or a residential structure (e.g., house, apartment). The container 102 will be discussed in more detail in connection with FIG. 2.

The central server 104 manages access to the locked container 102. In some embodiments, the central server 104 receives a digitally encoded lock mechanism (e.g., a code or instructions) that is use to lock the container. In some embodiments, the digitally encoded lock mechanism may be, or may indicate, the access key to unlock the container 102. The digitally encoded lock mechanism may be stored at the central server 104 and a corresponding access key may be relayed by the central server 104 to the recipient 112 (e.g., to the recipient device 108). While only one central server 104 is shown, alternative embodiments may comprise any number of central servers 104 to perform operations of the security provider system. The central server 104 will be discussed in more detail in connection with FIG. 3.

The sender device 106 may, in some embodiments, be used by the sender 110 to send the access key to the recipient 112. The sender 110 may be a human user (e.g., a human being), a machine user (e.g., a computer configured by a software program to interact with the sender device 106), or any suitable combination thereof (e.g., a human assisted by a machine or a machine supervised by a human). The sender 110 is not part of the environment 100, but is associated with the sender device 106 and may be a user of the sender device 106. For example, the sender device 106 may be a smartphone, a telephone, a desktop computer, a vehicle computer, a tablet computer, a portable media device, a smartphone, a wearable device (e.g., a smart watch or smart glasses), or any other device capable of making a call or transmitting or otherwise communicating a message.

In example embodiments, the access key may be sent directly to the recipient 112 or be relayed through the central server 104 to the recipient 112. For example, the sender 110 may manually enter the digitally encoded lock mechanism into an input unit on the container 102 to lock the container 102. The sender 110 then sends (e.g., calls, e-mails, or texts) a copy of the entered digitally encoded lock mechanism (e.g., which may form the access key) to the recipient 112, the recipient device 108, or the central server 104. In alternative embodiments, the container 102, itself, may send the copy of the entered digitally encoded lock mechanism (e.g., the access key) to the recipient 112, the recipient device 108, or the central server 104.

The recipient device 108 comprises any device of the recipient 112 that can receive a copy of the digitally encoded lock mechanism (that may be used as the access key) or another form of the access key (e.g., a thumbprint or a voice signal) to unlock the container 102. For example, the recipient device 108 may be a landline telephone on which the recipient 112 receives an audio call (e.g., from the sender 110 or the central server 104) indicating the access key. Alternatively, the recipient device 108 may receive a series of dual-tone multi-frequency (DTMF) tones as the access key. In other examples, the recipient device 108 may be a mobile device having an application installed thereon capable of receiving the access key and determining whether to send instructions to the container 102 to unlock the container 102. The recipient device 108 will be discussed in more detail in connection with FIG. 4.

The recipient 112 may be a human user (e.g., a human being), a machine user (e.g., a computer configured by a software program to interact with the recipient device 108), or any suitable combination thereof (e.g., a human assisted by a machine or a machine supervised by a human). The recipient 112 is not part of the environment 100, but is associated with the recipient device 108 and may be a user of the recipient device 108. For example, the recipient device 108 may be a smartphone, a telephone, a desktop computer, a vehicle computer, a tablet computer, a portable media device, a smartphone, a wearable device (e.g., a smart watch or smart glasses), or any other device capable of making a call or transmitting or otherwise communicating a message.

The copy of the digitally encoded lock mechanism or the access key may be sent using any communication network. Accordingly, the communication network may be a wired network, a wireless network (e.g., a mobile or cellular network), or any suitable combination thereof. The network may include one or more portions that constitute a private network, a public network (e.g., the Internet), or any suitable combination thereof. Accordingly, the network may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMAX network), or any suitable combination thereof. Any one or more portions of the network may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Figure 2:
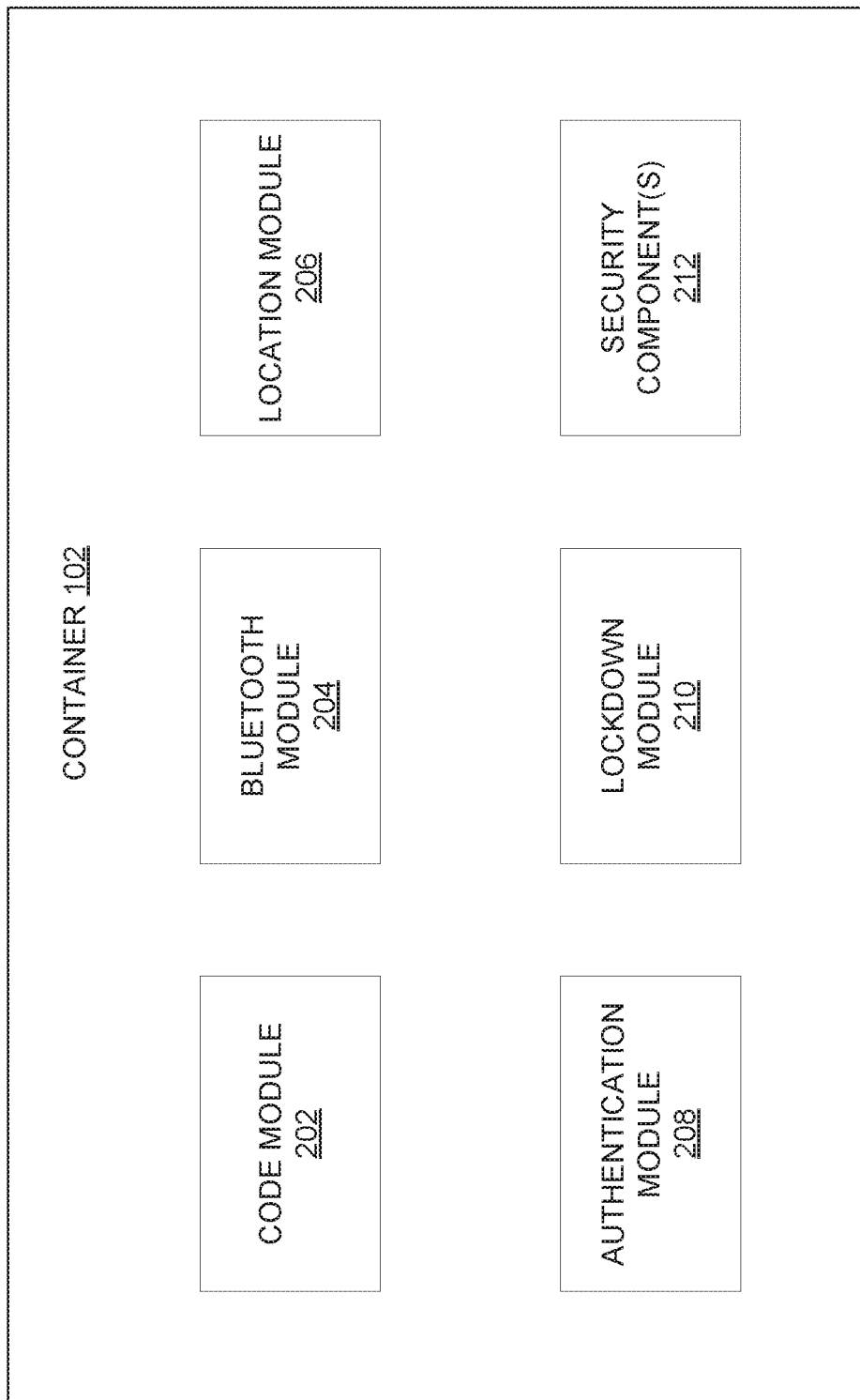
FIG. 2 is a block diagram illustrating an example embodiment of the container.

FIG. 2 is a block diagram illustrating an example embodiment of the container 102. The container 102 comprises a housing (not shown explicitly) capable of holding and securing content to be shipped to the recipient 112. Additionally, the container 102 includes a locking device (not shown explicitly) that may be locked by the sender 110 after the sender 110 places content within the container 102. The locking device may comprise or be linked to a code module 202, a Bluetooth® module 204, a location module 206, an authentication module 208, or a lockdown module 210. The container 102 may also comprise one or more security components 212. Each of the modules and components may be communicatively coupled together.

The code module 202 manages the receipt of codes to lock and unlock the container 102. In some embodiments, the code module 202 may include or be coupled to a (physical or virtual) keyboard or keypad that receives an entered digitally encoded lock mechanism from the sender 110 to lock the container 102 and receives an entered access key or code from the recipient 112 to unlock the container 102. In other embodiments, the code module 202 may include or be coupled to a microphone that receives an audio access key or code. For example, the audio access key may comprise a series of one or more DTMF tones. Further still the audio access key may be a voice of the recipient 112 in embodiments having a voice recognition code module (not shown).

The Bluetooth module 204 manages communications with various devices via Bluetooth, such as for the receipt of the access key via Bluetooth from the recipient device 108. In some embodiments, the access key is a code that is entered into or received from the recipient device 108. For example, the recipient 112 may enter the access key into an unlock application operating on the recipient device 108, and the recipient device 108 may transmit the access key to the Bluetooth module 204. In other embodiments, the access key comprises instructions from the recipient device 108 to unlock the container 102. For example, the instructions may be received in response to a thumbprint application operating on the recipient device 108 verifying a (previously stored) thumbprint of the recipient 112. In example embodiments, Bluetooth capabilities may be powered by a battery, kinetics, or solar power (e.g., panels on the container 102).

The location module 206 manages access to the content locked in the container 102 based on a location of the container 102. Accordingly, the location module 206 may comprise or be coupled to a global positioning system (GPS). In one embodiment, when the location module 206 detects arrival at a location associated with the recipient 112, the location module 206 may instruct the container 102 to unlock (e.g., provide an access key that is an instruction to unlock the container 102 to the authentication module 208). In other embodiments, the location module 206 may provide, for example, a second or third factor for the authentication process. For example, the container 102 may only open if both the code (e.g., access key) entered by the recipient 112 matches the digitally encoded lock mechanism and the container 102 is in the location corresponding to the recipient 112 (e.g., a shipping address of the recipient 112).

In another embodiment, the container 102 may only open if the code (e.g., access key) entered by the recipient 112 matches the digitally encoded lock mechanism, a signal is received from the recipient device 108 verifying a thumbprint of the recipient 112 (e.g., using a thumbprint application operating on the recipient device 108), and the container 102 is in the location corresponding to the recipient 112 as determined by the location module 206.

The location module 206 may also provide alerts based on location. For example, a courier may have a plurality of containers for delivery (e.g., in their truck or in a drone). Each container may have, for example, a red/green LED light that will indicate (e.g., turns green) when at a proper location (e.g., location of the recipient 112). Alternatively, an audio signal may be given when at the proper location. In these embodiments, an address label may be optional. Additionally, the location module 206 may provide a signal (e.g., blinking red LED light or audio signal), when the container 102 has traveled off course (e.g., by a predetermined amount) from a location of the recipient 112. Further still, the courier may, in some embodiments, ping each of a plurality of the containers 102 to determine which one to deliver at a particular location.

The authentication module 208 manages the authentication process at the container 102 to determine whether to unlock the container 102. In example embodiments, the authentication module 208 may receive the access key in a form of a code and compare the access key to the digitally encoded lock mechanism that was used to lock the container 102. Alternatively, the authentication module 208 may receive an audio signal (e.g., DTMF tones or voice of the recipient 112) as the access key and use the audio signal to determine whether to unlock the container 102 (e.g., voice authenticated as that of the recipient). Additionally or alternatively, the authentication module 208 may receive instructions (e.g., also referred to as an "access key") from the recipient device 108 that instructs the authentication module 208 to unlock the container 102.

The lockdown module 210 manages a lock down process such that the lock on the container 102 is disabled from being unlocked until reset. For example, the lockdown module 210 may lock down the container 102 in response to an entered access key not matching the digitally encoded lock mechanism after a predetermined number of tries. In another example, the lockdown module 210 may lock down the container 102 based on a determination by the location module 206 that the container 102 is not in a location corresponding to the recipient 112. Once locked down, the container 102 may require a reset to be performed by an authorized agent (e.g., an agent of the security provider system) before attempts to unlock the container 102 may be made again. For example, the recipient 112 may need to call or bring the container 102 to an agent and provide proof of his or her identity before the container 102 is reset.

The security components 212 may comprise various sensors and devices that may verify content, verify the recipient 112, or verify proper handling of the container 102. One example of the security component 212 may be a camera. The camera may be used to capture an image of the recipient 112 and provide the captured image to the authentication module 208 in embodiments having a facial recognition authentication process. The authentication of the image of the recipient 112 may then trigger the unlocking of the container 102.

Another example security component 212 may be a weight scale. The weight scale may measure a weight of the content when initially placed into the container 102. Upon receipt and opening of the container 102 by the recipient 112, the weight of the content may be verified by the weight scale. Thus, if content is missing, the weight upon receipt will not match the weight upon initial placement into the container 102.

Yet other security components 212 may be an accelerometer or gyroscope. The accelerometer may indicate if the container 102 was thrown or experienced a sudden stop in movement. The gyroscope may indicate if the container 102 was shipped in a proper orientation. The use of the accelerometer or the gyroscope may be useful in embodiments where fragile content is shipped.

A further security component 212 may be a bill counter. The bill counter may be employed in a container 102 that is used, for example, to deposit cash to a bank, make a cash withdrawal, or to make a cash payment. The bill counter may scan the cash as it is placed into the container 102. In one embodiment, the recipient 112 may be able to confirm the amount of cash in the container 102 without having to open the container 102 based on data from the bill counter. In one embodiment, the container 102 may display information regarding the amount of cash to the recipient device 108.

Another security component 212 may be a visual display. The visual display provides validation that correct content is being placed into the container 102. For example, a pharmacist or other person that is actually putting the content in the container 102 can see a picture of what they are supposed to place in that container 102 on the visual display. Additionally, the recipient 112 can also see and verify what content should have been placed in the container 102 when the recipient 112 opens the container 102.

Additionally, the container 102 may be tamper-resistant. For example, a security component 212 may be an oxygen ($O_2$) bottle that explodes if the container 102 is not properly unlocked and opened. In another example, the security component 212 may be a form of liquid that may destroy documents in the container 102 if the container 102 is not property unlocked and opened. Furthermore, the container 102 may be waterproof (e.g., has a gas pressure valve so as not to pop open when depressurized).

In some embodiments, the container 102 may also have or be coupled to a cooling system. For example, the content may be perishable (e.g., food, organ donations, or cold storage drugs such as vaccines that need to be in a certain temperature range). In one embodiment, the container 102 may plug into an external cooling system that provides external refrigerant or cooling. In this embodiment, the container 102 may dock into a delivery vehicle and pulls power from the delivery vehicle. The cooling system ensures that a temperature is maintained within a specified temperature range. Additionally, if the internal temperature varies from the specified range, the recipient 112 may be alerted (e.g., via a display with an alert pushed to the recipient device 108), so that they can reject the shipment.

Figure 3:
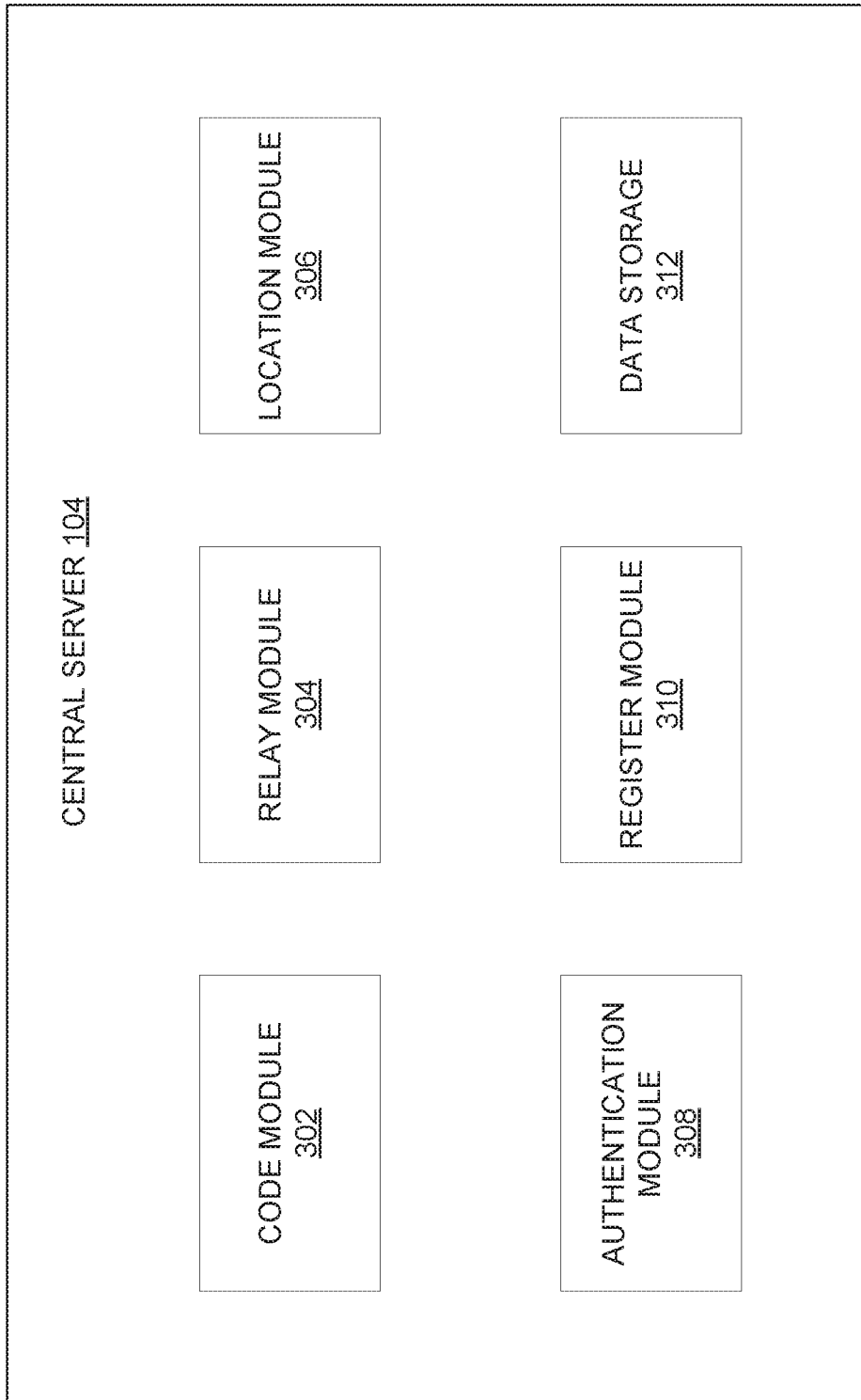
FIG. 3 is a block diagram illustrating an example embodiment of a central server of a security provider system.

FIG. 3 is a block diagram illustrating an example embodiment of the central server 104 of the security provider system. The central server 104 manages access to the locked container 102 in some embodiments where the container 102 does not perform the authentication or where the access key is not directly sent from the sender 110 to the recipient 112 (e.g., relayed through the central server 104). Accordingly, the central server 104 may comprise at least certain components including a code module 302, a relay module 304, a location module 306, an authentication module 308, a register module 310, and a data storage 312.

In example embodiments, the code module 302 manages the receipt and storage of codes (e.g., a copy of the digitally encoded lock mechanism used to secure the container 102). For example, when the sender 110 locks the container 102 using the digitally encoded lock mechanism, the central server 104 receives an indication of the digitally encoded lock mechanism that is used to lock the container 102. The copy of the digitally encoded lock mechanism may be stored in the data storage 312.

In example embodiments, the relay module 304 provides a copy of the digitally encoded lock mechanism (e.g., the access key) to unlock the container 102 to the recipient 112. In some cases, the access key is a copy of the digitally encoded lock mechanism. For example, if the sender 110 locks the container 102 using a numeric code (e.g., "1234"), the access key may be a copy of the numeric code (e.g., "1234"). Thus, the relay module 304 relays the access key (e.g., "1234") to the recipient 112 or to the recipient device 108. It is noted that in some embodiments, the access key may be sent from the sender 110 directly to the recipient 112 or the recipient device 108. In these embodiments, the operations of the relay module 304 are not necessary. Further still, the access key may be a password or alphanumeric code.

The location module 306 may monitor the location of the container 102 and trigger location-based operations. In some embodiments, the location module 306 may receive location information (e.g., GPS tracking information) of the container 102. In one embodiment, when the location module 306 detects that the container 102 has arrived at a location associated with the recipient 112, the location module 306 may trigger the relay module 304 to provide the access key to the recipient 112 or the recipient device 108. For example, the location module 306 may trigger the relay module 304 to call or otherwise communicate with the recipient device 108 and provide DTMF tones that will cause the container 102 to unlock. In other embodiments, when the location module 306 detects the container 102 has arrived at a location associated with the recipient 112, the location module 306 may trigger the authentication module 308 to send instructions to unlock the container 102.

The authentication module 308 manages the authentication process at the central server 104 to determine whether to unlock the container 102. In some embodiments, the authentication module 308 may receive the access key via the container 102 from the recipient device 108. The access key may then be compared with the copy of the digitally encoded lock mechanism stored in the data storage 312 for that container 102. If the access key is authenticated (e.g., matches the digitally encoded lock mechanism), the authentication module 308 may send a signal or instructions to the container 102 that causes the container 102 to unlock.

The register module 310 allows users (e.g., the sender 110 or the recipient 112) to register themselves or their user devices with the security service provider. By registering, the user may provide the security service provider with one or more locations associated with the user (e.g., home address, work address, or dedicated shipping address). The locations may then be used by the location module 306. Additionally, the user may provide the security service provider with a list of one or more sender devices 106 or one or more recipient devices 108 (e.g., provide a MAC address or Bluetooth profile). As a result, the access code may be transmitted by the central server 104 to, for example, any of the one or more recipient devices 108. Further still, the registered user may provide biometric information such as fingerprints, a facial image, or voice recording, which may be used to verify an identity of the user (e.g., the recipient 112).

Figure 4:
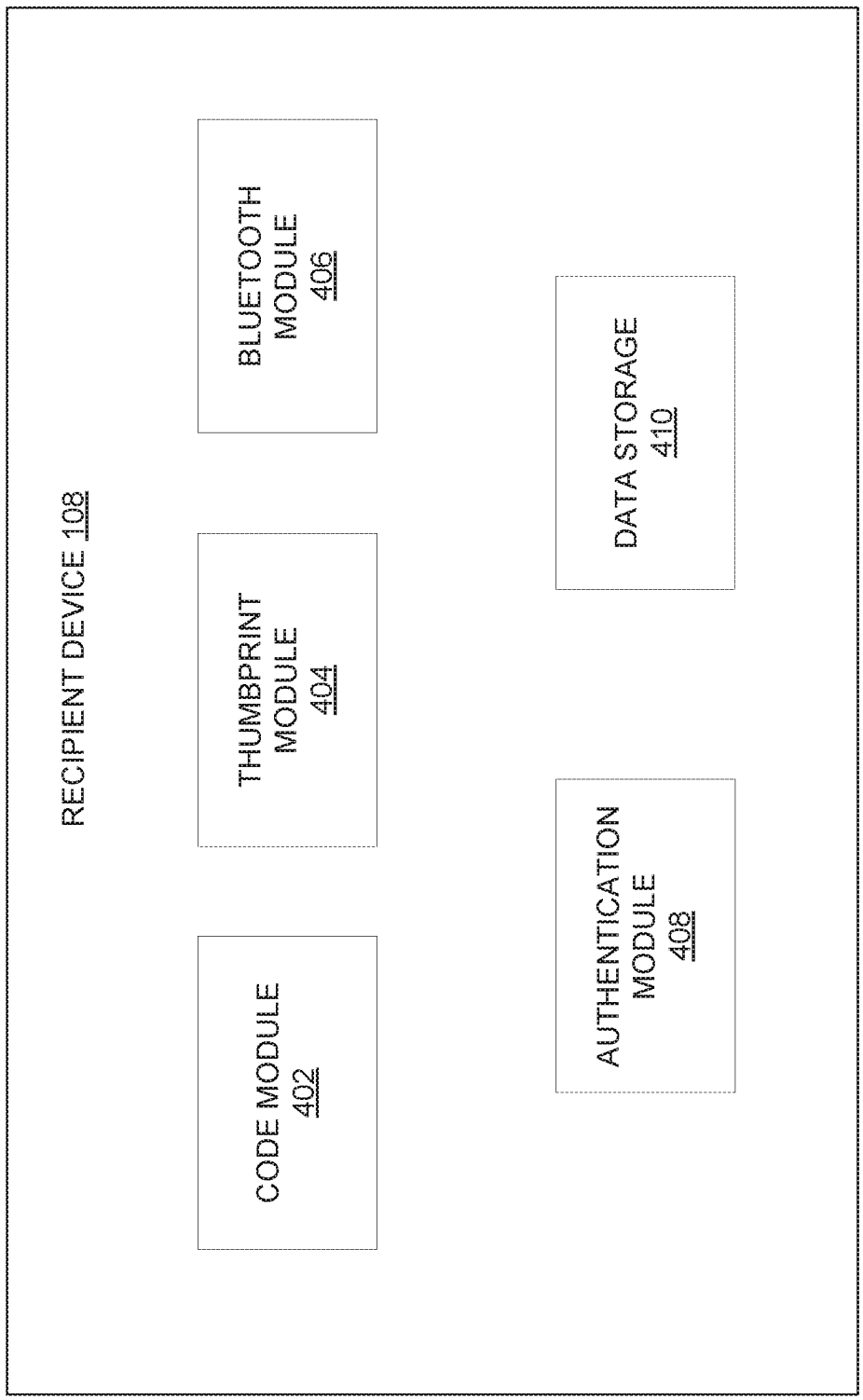
FIG. 4 is a block diagram illustrating an example embodiment of the recipient device.

FIG. 4 is a block diagram illustrating an example embodiment of the recipient device 108. The recipient device 108 is a device of the recipient 112 that is capable of receiving the access key as well as performing at least some forms of authentication. To enable these operations, the recipient device 108 may comprise at least certain components including a code module 402, a thumbprint module 404, a Bluetooth module 406, an authentication module 408, and a data storage 410. The recipient device 108 may comprise other components that are not pertinent to example embodiments.

The code module 402 manages the receipt of the access key. In some cases, the access key may be received from the sender 110 or the sender device 106. In other embodiments, the access key may be received via the central server 104. The access key may be received in any form such as, for example, as a text, in an e-mail, or via a phone call. In some cases, the access key may be stored to the data storage 410 for later use. In other cases, the access key may be received upon the delivery of the container 102 and may be used directly to cause the unlocking of the container 102. Additionally, the code module 402 may receive the access key from the recipient 112 that is attempting to unlock the container 102, and provide the access key to the authentication module 408.

The thumbprint module 404 manages the authentication of a thumbprint or other print (e.g., palm print or fingerprint) of the recipient 112. Accordingly the thumbprint module 404 may comprise or be coupled to a thumbprint scanner that can scan a thumbprint. The thumbprint module 404 may then verify that the thumbprint is that of the recipient 112 by comparing the thumbprint to one that is stored in the data storage 410. While a thumbprint is discussed, it is noted that any fingerprint may also be used to verify the identity of the recipient 112.

Based on the authentication, the thumbprint module 404 may send a signal to the container 102 indicating the authentication has been completed. The signal may comprise instructions to unlock the container 102. In one embodiment, the signal is sent by the Bluetooth module 406. The Bluetooth module 406 may, in other cases, provide the access key to the container 102. Further still, the Bluetooth module 406 may provide the signal to unlock the container 102 when the container 102 is located within a predetermined distance of the recipient device 108 (e.g., based on the recipient device 108 detecting a presence of the container 102).

While the thumbprint application and thumbprint module 404 were discussed as being a part of the recipient device 108, alternatively, these components may be embodied in, or coupled to, the container 102. As such, the container 102, itself, may comprise a scanner to scan the recipient's thumbprint and verify the recipient's identity. Further still, while example embodiments discuss verifying thumbprints, alternative embodiments may verify any biometrics (e.g., one or more fingerprints, facial recognition, or retinal scan) or voice of the recipient 112.

The authentication module 408 provides functionalities similar to the authentication module 208 of the container 102 and the authentication module 308 on the central server 104. As such, the authentication module 408 may authenticate the access key and cause a signal to be provided to the container 102 to unlock the container 102 based on an outcome of the authentication process.

Figure 5:
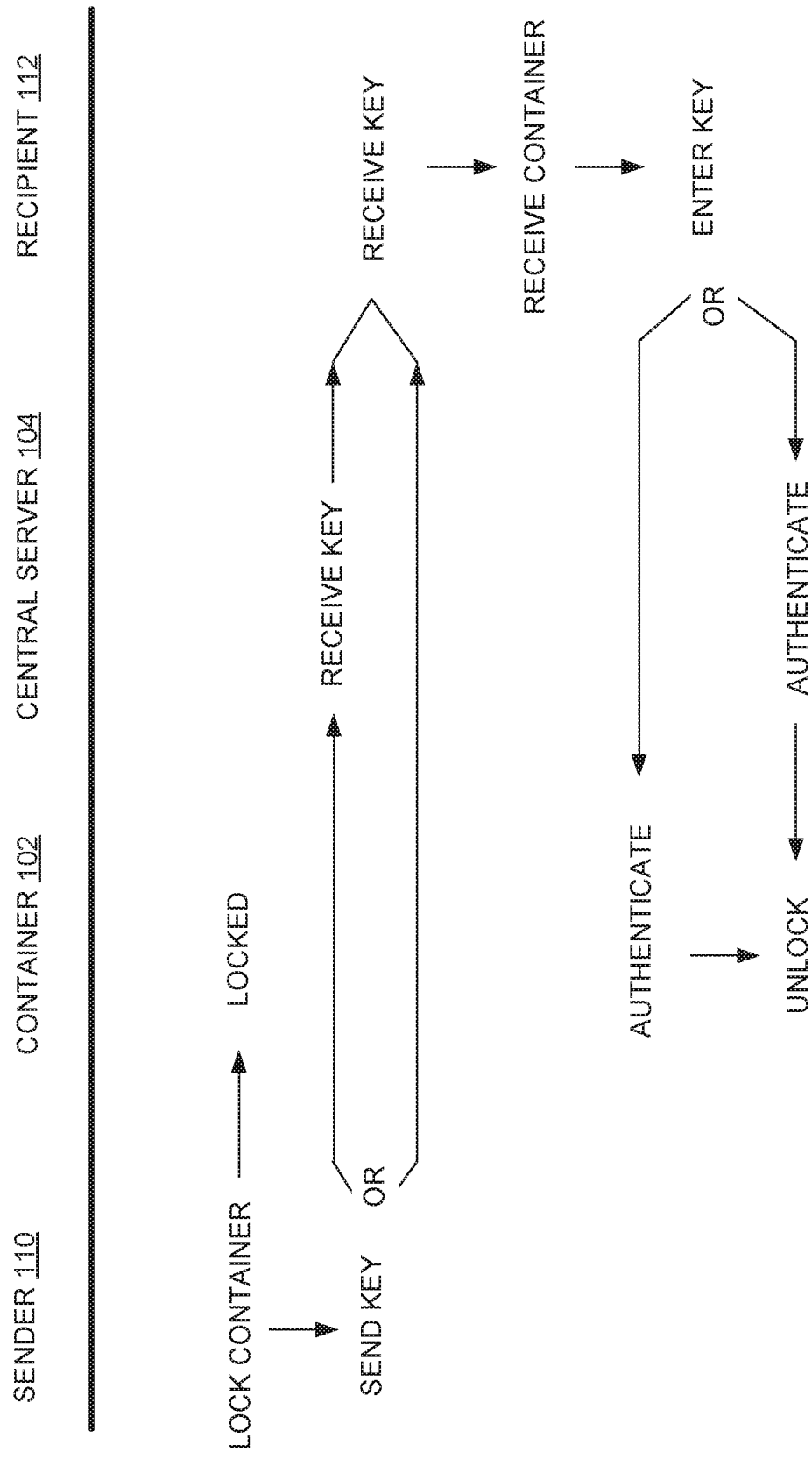
FIG. 5 is a communication flow diagram for providing access to a locked container according to one example embodiment.

FIG. 5 is a communication flow diagram for providing access to the container 102 that has been locked, according to one example embodiment. The sender 110 places content into the container 102 and locks the container 102, for example, using a digitally encoded lock mechanism. The sender 110 then provides a copy of the digitally encoded lock mechanism (e.g., the access key) to the recipient 112. Accordingly, the access key may be provided directly to the recipient 112 (or the recipient device 108) or be relayed through the central server 104 to the recipient 112 (or the recipient device 108). The access key may be provided in a text, in an e-mail, verbally using a phone call, or using any other means of communication or signaling.

Once the container 102 is received by the recipient 112, the recipient 112 may provide the access key to the container 102 (e.g., to enter into a keypad of the container 102). The container 102 may perform an authentication process to determine whether to unlock the container 102 (e.g., compare the access key with the digitally encoded lock mechanism to determine if they match). Alternatively, the container 102 may provide the access key to the central server 104 that performs the authentication process. Based on a determination to unlock the container 102, the container 102 is unlocked.

Figure 6:
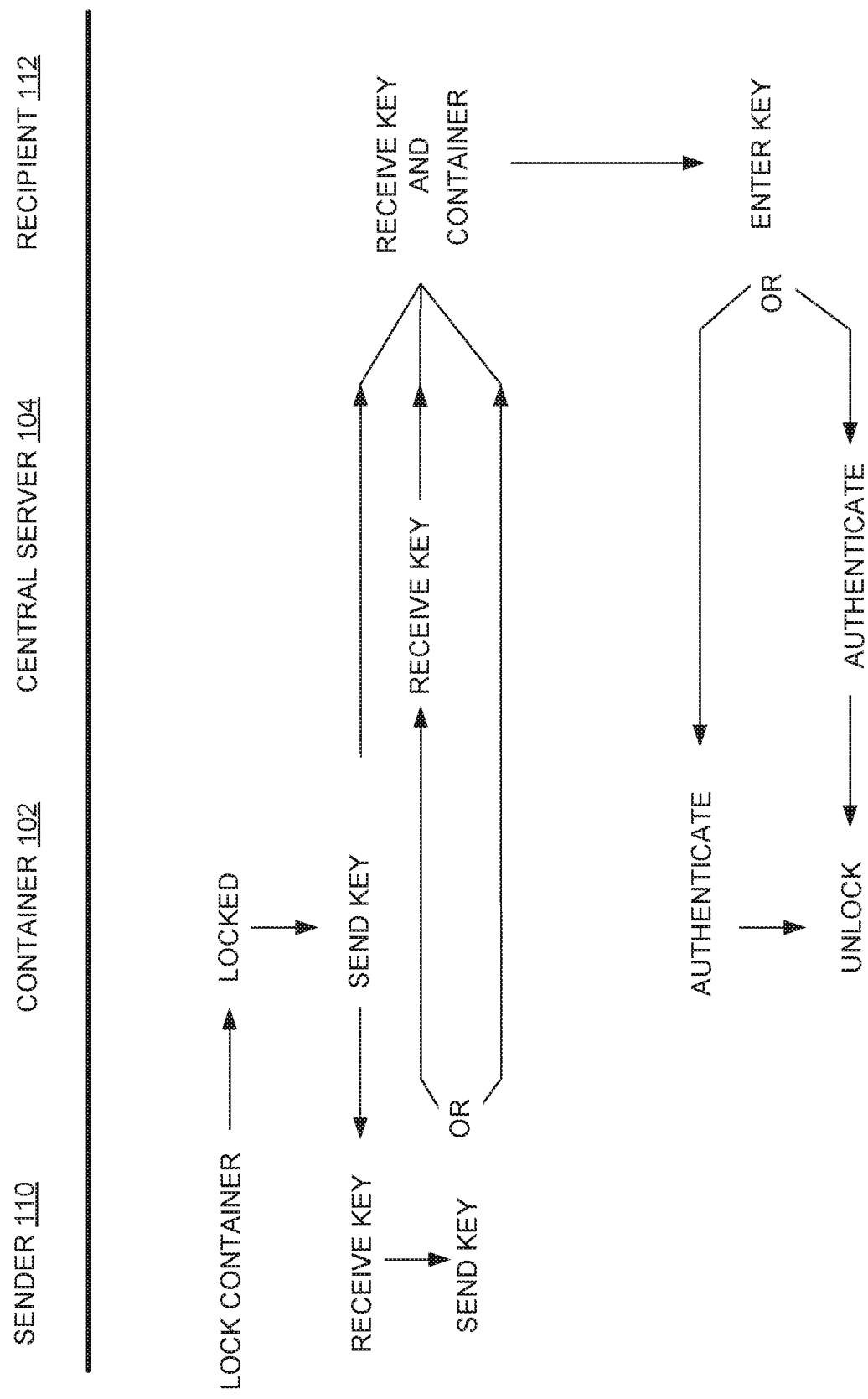
FIG. 6 is a communication flow diagram for providing access to a locked container according to another example embodiment.

FIG. 6 is a communication flow diagram for providing access to the locked container 102 according to another example embodiment. The sender 110 places content into the container 102 and locks the container 102, for example, using a digitally encoded lock mechanism. In this embodiment, the container 102 then provides a copy of the digitally encoded lock mechanism (e.g., the access key) to the sender device 106, the recipient 112 (or recipient device 108), or the central server 104, which relays the access key to the recipient 112 (or recipient device 108). In one embodiment, the access key is provided by the container 102 via Bluetooth. For example, the container 102 may send the access key to the sender device 106 while the container 102 is in proximity to the sender device 106. Alternatively, the container 102 may send the access key to the recipient device 108 upon delivery to the recipient 112 and within range of the recipient device 108.

Once the container 102 is received by the recipient 112, the recipient 112 may provide the access key to the container 102 (e.g., enter into a keypad of the container 102). The container 102 may perform an authentication process to determine whether to unlock the container 102 (e.g., compare the access key with the digitally encoded lock mechanism to determine if they match). Alternatively, the container 102 may provide the access key to the central server 104, which performs the authentication process. Based on a determination to unlock, the container 102 is unlocked.

Figure 7:
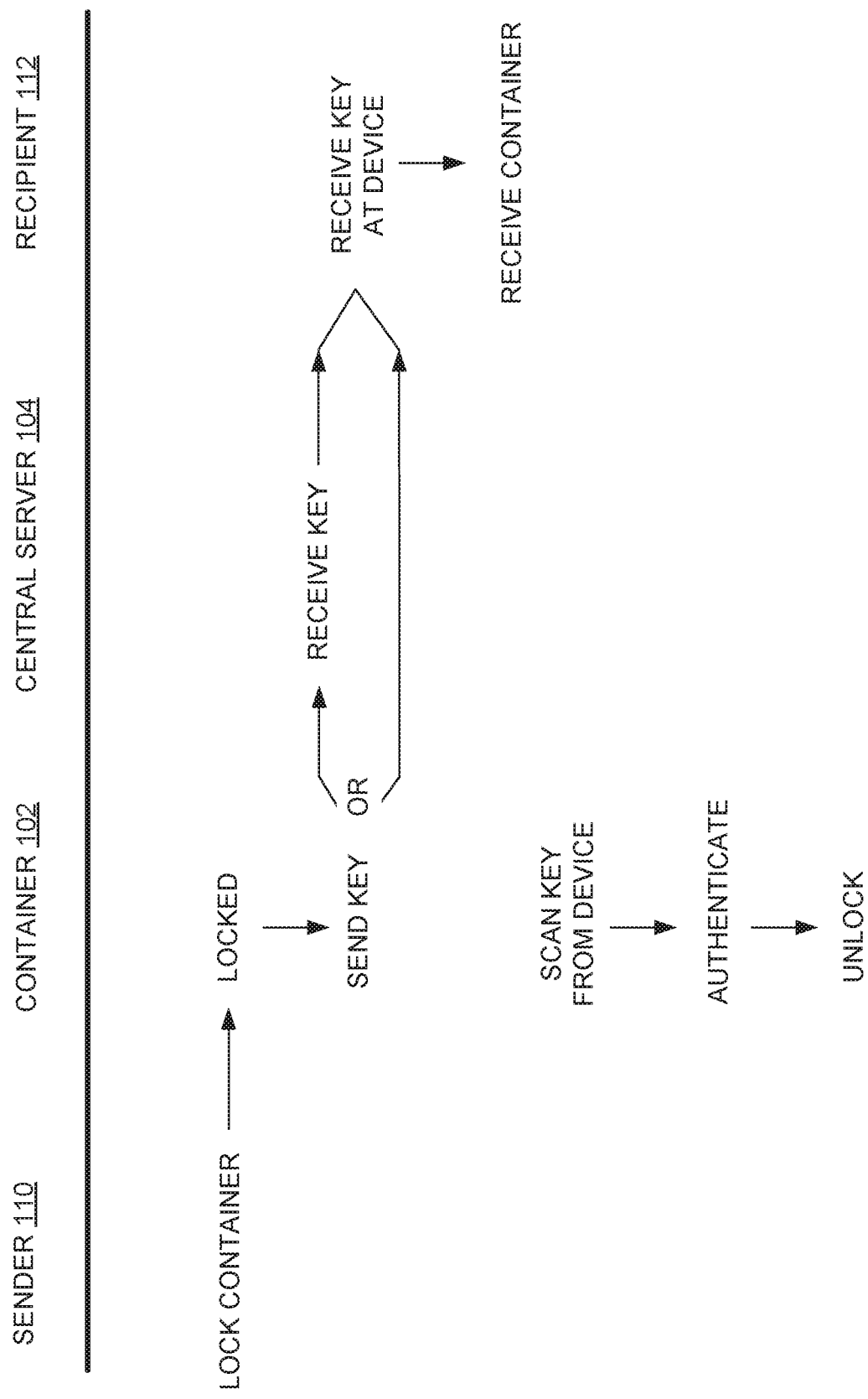
FIG. 7 is a communication flow diagram for providing access to a locked container according to a further example embodiment.

FIG. 7 is a communication flow diagram for providing access to the container 102 after it has been locked, according to a further example embodiment. In this embodiment, the access key is a scannable code. Accordingly, the sender 110 places content into the container 102 and locks the container 102. In one embodiment, the container 102 (or a device of the sender 110) sends the access key in the form of a scannable code (e.g., a QR code) to the recipient device 108. For example, the container 102 may, upon being within range of the recipient device 108, provide the scannable code via Bluetooth. Alternatively, the access code may be relayed through the central server 104 to the recipient device 108. The access code is displayable on a screen of the recipient device 108.

Upon receipt of the container 102 by the recipient 112, the container 102 scans the access key from the recipient device 108. In one example, the container 102 may comprise a camera or image scanning component to scan the access key displayed on the screen of the recipient device 108. The container 102 may then perform an authentication process to verify the scanned access key. Based on authentication of the scanned access key, the container 102 is then unlocked. In an alternative embodiment, the container 102 may provide the scanned access key to the central server 104, which performs the authentication process.

Figure 8:
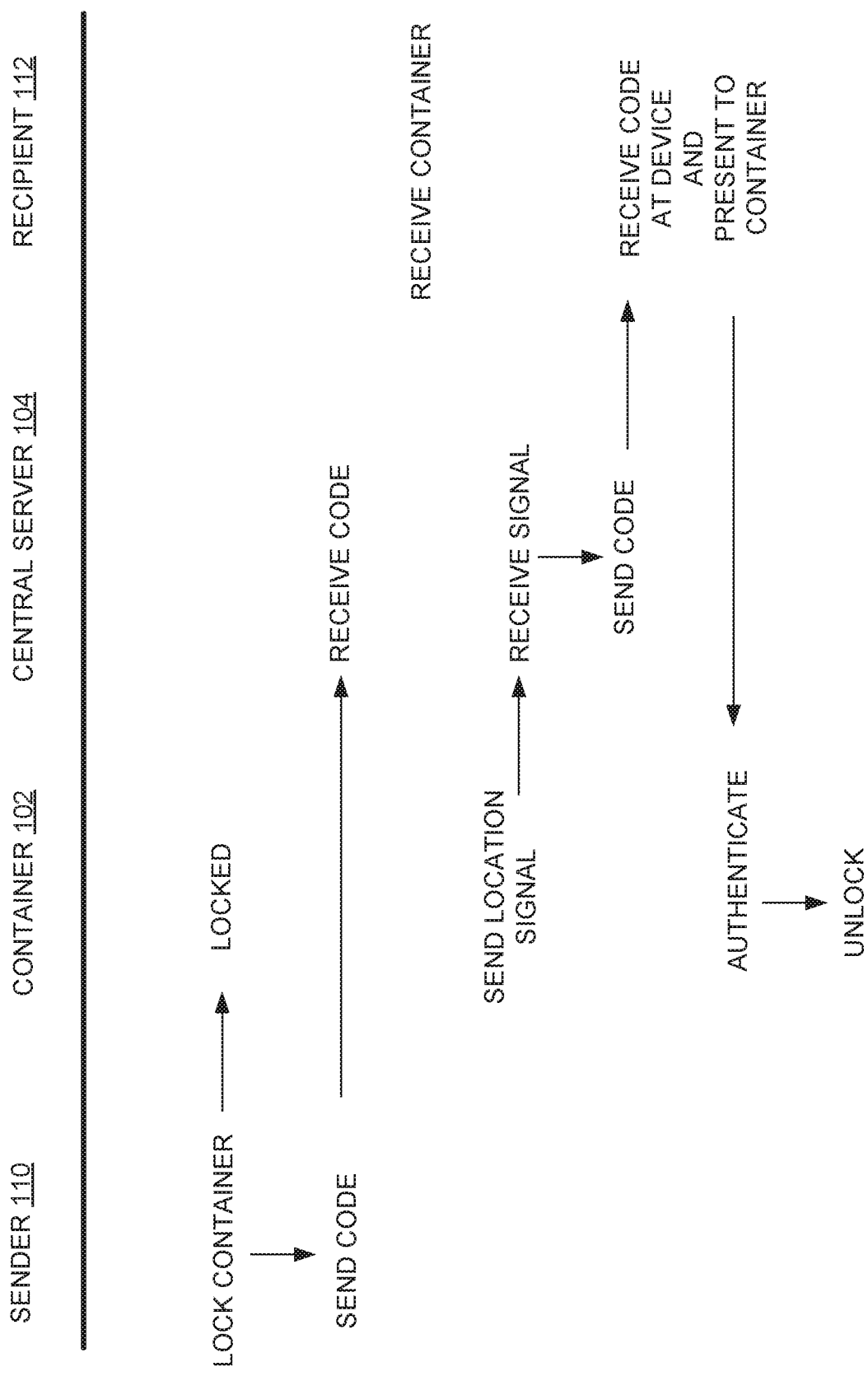
FIG. 8 is a communication flow diagram for providing access to a locked container according to another example embodiment.

FIG. 8 is a communication flow diagram for providing access to the locked container 102 according to another example embodiment. The embodiment of FIG. 8 uses a location of the container 102 as a trigger to send the access key to the recipient 112. Accordingly, the sender 110 places content into the container 102 and locks the container 102. The sender 110 (or the sender device 106) then sends the access key to the central server 104. The central server 104 may store the access key.

The container 102 is shipped and received by the recipient 112. When the container 102 arrives at a predetermined location corresponding to the recipient 112, the central server 104 sends the access key to the recipient 112 (or to the recipient device 108). In one embodiment, the container 102 may provide a location signal in the form of position data (e.g., GPS coordinates) to the central server 104. The central server 104 may then determine whether the position data corresponds to the location of the recipient 112. In an alternative embodiment, the container 102 may have location information (e.g., coordinates) for the predetermined location of the recipient 112. When the container 102 detects that it is at the location of the recipient 112, the container 102 may send a location signal to the central server 104 that confirms arrival of the container 102 at the location. Based on the container 102 being at the location of the recipient 112, the central server 104 sends the access key to the recipient 112 (or to the recipient device 108).

The recipient 112 receives the access key and may provide the access key to the container 102 (e.g., enter the access key into a keypad of the container 102). The container 102 may perform an authentication process to determine whether to unlock the container 102. Alternatively, the container 102 may provide the access key to the central server 104, which performs the authentication process. Based on a determination to unlock, the container 102 is unlocked.

Figure 9:
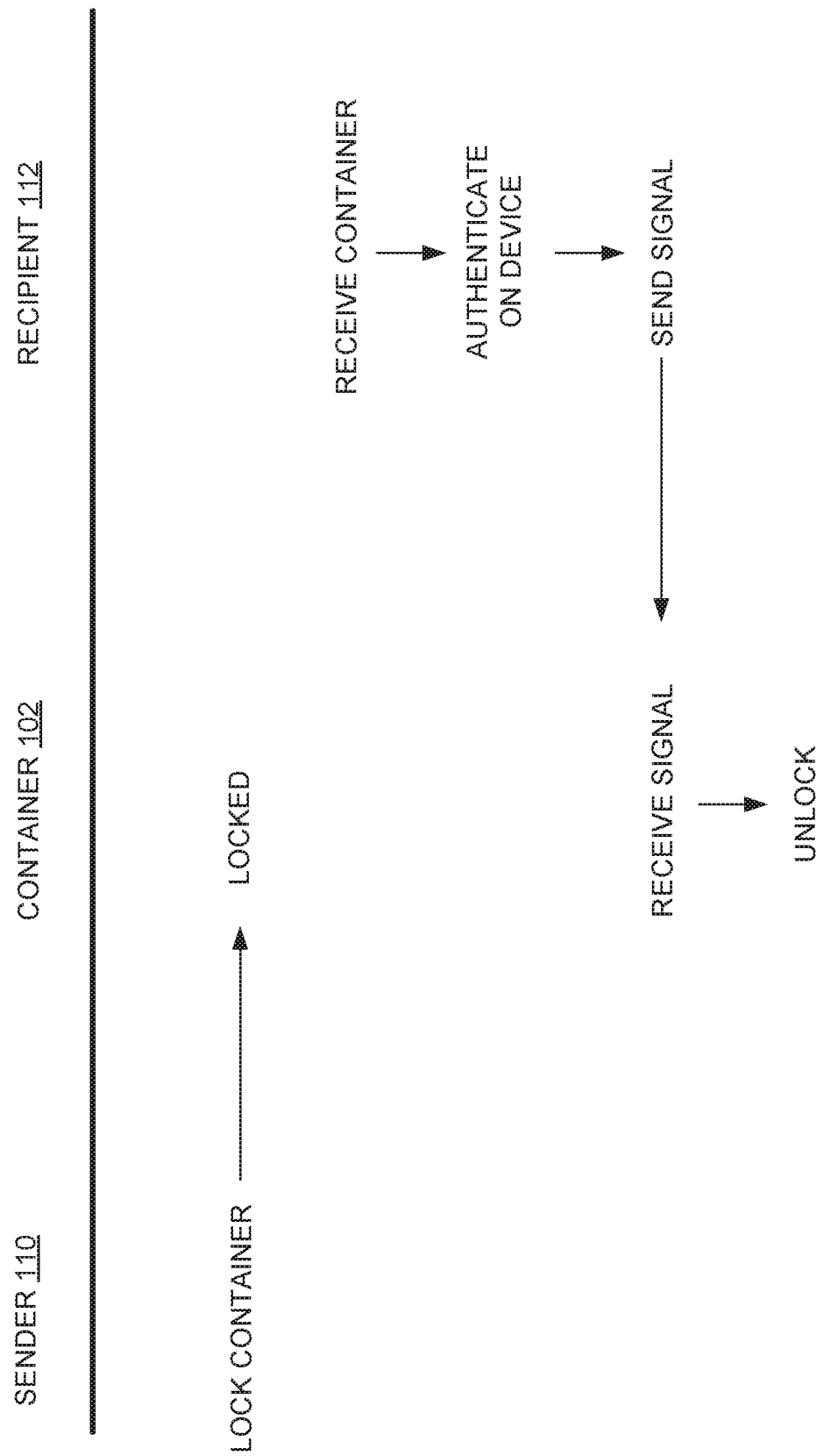
FIG. 9 is a communication flow diagram for providing access to a locked container according to a further example embodiment.

FIG. 9 is a communication flow diagram for providing access to the locked container 102 according to a further example embodiment. The embodiment of FIG. 9 uses an authentication application on the recipient device 108 to perform an authentication process. Accordingly, the sender 110 places content into the container 102 and locks the container 102. The sender 110 (or the sender device 106) then sends the access key to the central server 104. The central server 104 may store the access key. The container 102 is then shipped to the recipient 112. Once received, the recipient 112 may activate the authentication application on the recipient device 108. For example, the recipient 112 may activate a thumbprint application. Once the authentication application authenticates the recipient 112, the recipient device 108 sends a signal (e.g., access key or instructions to unlock) to the container 102 that causes the container 102 to unlock.

While various embodiments for opening the locked container 102 have been described in FIGS. 5 through 9, further embodiments may combine any two or more of these embodiments or variations of these embodiments to enable a multi-factor authentication process. For instance, the container 102 may be unlocked based on the access key matching the digitally encoded lock mechanism and the container 102 being in a location corresponding to the recipient 112 (e.g., receiving a Bluetooth signal from the recipient device 108). In other example, a three-factor authentication may require that the access key match the digitally encoded lock mechanism, the container 102 is at a location corresponding to the recipient 112, and a thumbprint application verifies the recipient's identity.

Figure 10:
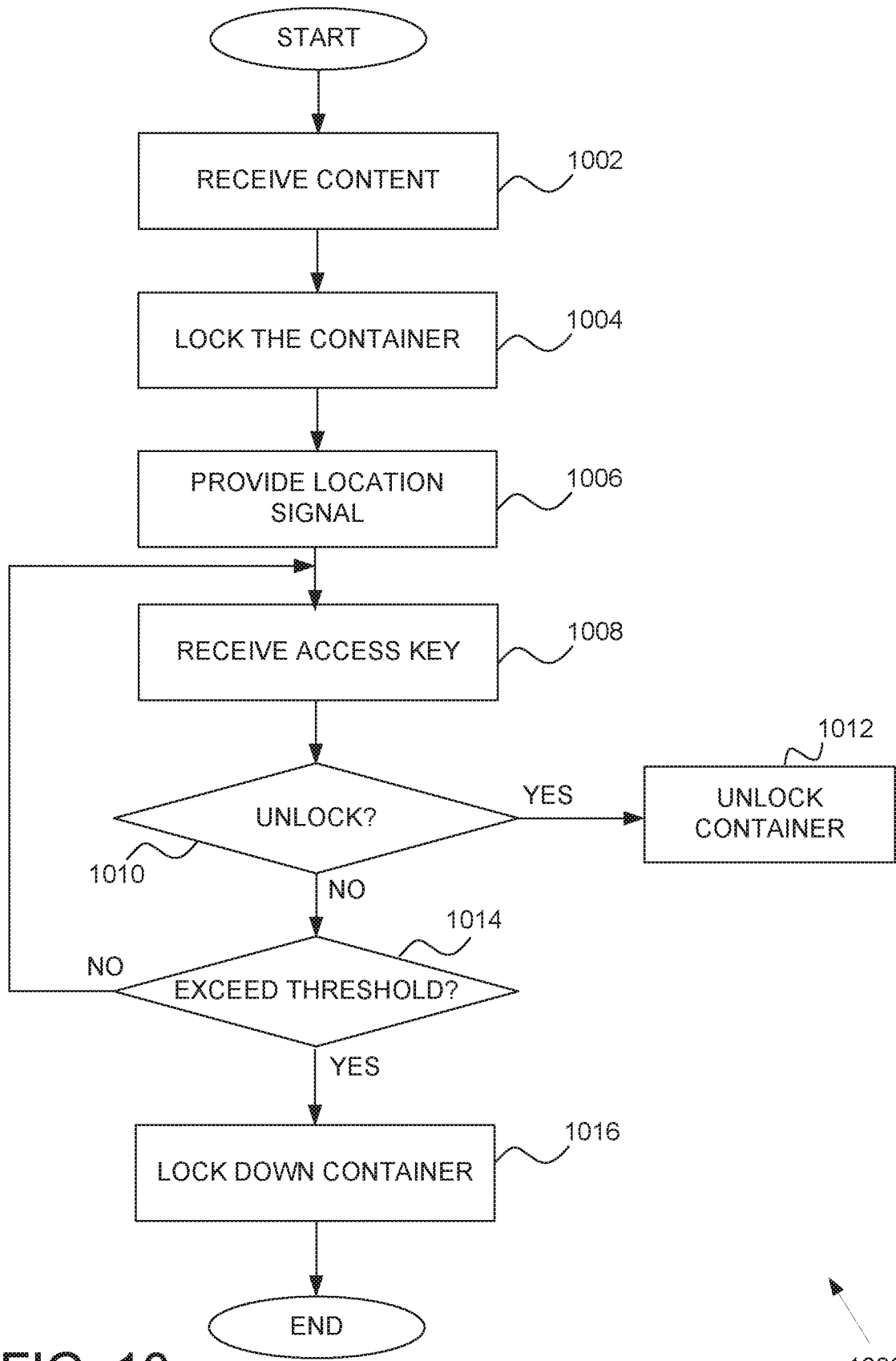
FIG. 10 is a flow diagram of an example method for providing access to a locked container.

FIG. 10 is a flow diagram of an example method 1000 for providing access to a locked container (e.g., the container 102). The operations of the method 1000 are performed from the perspective of the container 102. In operation 1002, content is received (e.g., placed into the container 102). In some embodiments, the content may be verified (not shown explicitly) as it is placed into the container 102. For example, a bill counter may determine the value of cash being placed into the container 102. In an alternative example, a display may be provided in or on the container 102 to illustrate the content that is to be placed into the container 102.

In operation 1004, the container 102 is locked. In example embodiments, the container 102 is locked using a digitally encoded lock mechanism entered by the sender 110. The container 102 is then shipped to the recipient 112.

At any time, the access key may be provided to the recipient 112. For example, the access key may be provided by the sender 110, the container 102, or the central server 104 as soon as the container 102 is locked with the digitally encoded lock mechanism.

In another example, the access key may be provided when the container 102 arrives at a location that corresponds to a predetermined location of the recipient 112 (e.g., the shipping address of the recipient 112). Accordingly, in operation 1006, a location signal may be provided (or caused to be provided) by the container 102. For instance, when the container 102 arrives at the location corresponding to the recipient 112 (e.g., as determined by GPS), the container 102 may transmit the location signal to, for example, the central server 104 or the sender device 106. In response to the location signal, the central server 104 or the sender device 106 may transmit the access key to the container 102 or the recipient device 108. In other embodiments, the central server 104 or the sender device 106 may send a signal to unlock the container 102 in response to the location signal. Alternatively, when the container 102 is at the location of the recipient 112, the container 102 may send the access key to or detect the access key from the recipient device 108 via Bluetooth.

In operation 1006, the access key is received. Subsequently, in operation 1010, a determination is made as to whether to unlock the container 102. In one embodiment, the access key may be compared (e.g., at the container 102 or at the central server 104) to the digitally encoded lock mechanism that was used to lock the container 102. If there is a match, the determination is made to unlock the container 102 in operation 1012. In another embodiment, the access key may comprise an unlock signal received from the central server 104 or the recipient device 108 (e.g., based on results of a thumbprint analysis of the recipient 112 or location of the container 102 relative to the recipient).

Further still, the determination to unlock may be based on a multi-factor authentication process. For instance, the container may be unlocked in operation 1012 based on the access key matching the digitally encoded lock mechanism and the container 102 be in a location corresponding to the recipient 112. In other example, a three-factor authentication may require that the access key match the digitally encoded lock mechanism, the container 102 is at a location corresponding to the recipient 112, and a biometric application (e.g., voice recognition application, retinal scan application, thumbprint application) verifies the recipient's identity.

If at operation 1010, a determination is made not to unlock the container 102 (e.g., the access key does not match the digitally encoded lock mechanism), then a determination is made in operation 1014 whether a number of attempts to unlock the container 102 has exceeded a predetermined threshold. (e.g., three attempts). If the predetermined threshold is not exceeded, the method 1000 returns to operation 1008 to receive the access key again.

However, if the predetermined threshold is exceeded, then the container 102 is locked down in operation 1016. Once locked down, the container 102 may require a reset to be performed by an authorized agent (e.g., an agent of the security provider system) before attempts to unlock the container 102 may be made again. In an alternative embodiment, the lock down of the container 102 may occur based on a determination by the location module 206 (FIG. 2) that the container 102 is not in a location corresponding to the recipient 112.

Figure 11:
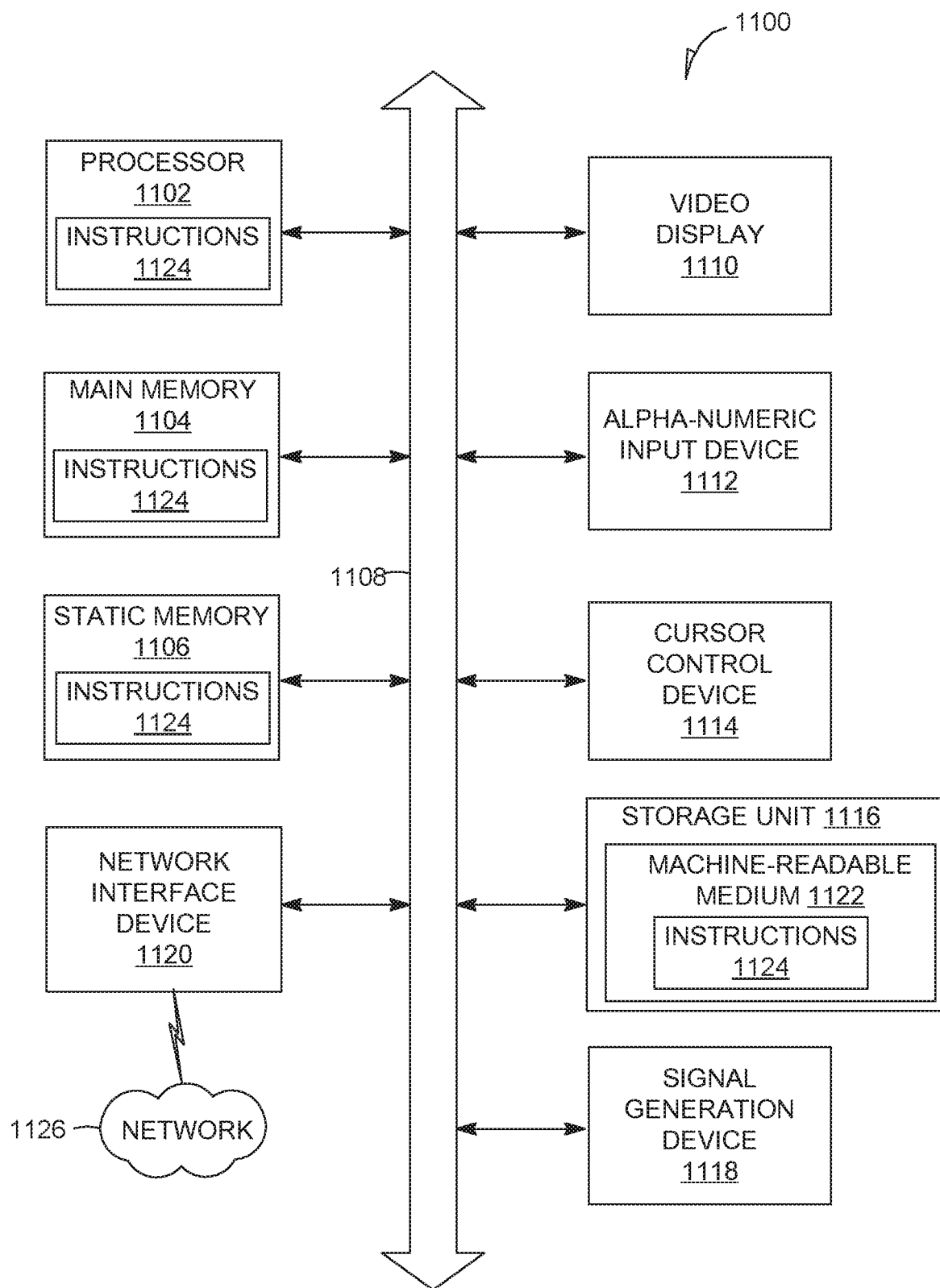
FIG. 11 is a simplified block diagram of a machine in an example form of a computing system within which a set of instructions for causing the machine to perform any one or more of the methodologies discussed herein may be executed.

FIG. 11 is a block diagram illustrating components of a machine 1100, according to some example embodiments, able to read instructions from a machine-readable medium e.g., a non-transitory machine-readable medium, a machine-readable storage medium, a computer-readable storage medium, or any suitable combination thereof) and perform any one or more of the methodologies discussed herein. Specifically, FIG. 11 shows a diagrammatic representation of the machine 1100 in the example form of a computer system and within which instructions 1124 (e.g., software, a program, an application, an applet, an app, or other executable code) for causing the machine 1100 to perform any one or more of the methodologies discussed herein may be executed.

In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a peer-to-peer (or distributed) network environment. The machine 1100 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1124, sequentially or otherwise, that specify actions to be taken by that machine. Further, while only a single machine is illustrated, the term "machine" shall also be taken to include a collection of machines that individually or jointly execute the instructions 1124 to perform any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The processor 1102 may contain microcircuits that are configurable, temporarily or permanently, by some or all of the instructions 1124 such that the processor 1102 is configurable to perform any one or more of the methodologies described herein, in whole or in part. For example, a set of one or more microcircuits of the processor 1102 may be configurable to execute one or more modules (e.g., software modules) described herein.

The machine 1100 may further include a graphics display 1110 (e.g., a plasma display panel (PDP), a light emitting diode (LED) display, a liquid crystal display (LCD), a projector, or a cathode ray tube (CRT)). The machine 1100 may also include an alphanumeric input device 1112 (e.g., a keyboard), a cursor control device 1114 (e.g., a mouse, a touchpad, a trackball, a joystick, a motion sensor, or other pointing instrument), a storage unit 1116, a signal generation device 1118 (e.g., a speaker), and a network interface device 1120.

The storage unit 1116 includes a machine-readable medium 1122 (e.g., a tangible and/or non-transitory machine-readable storage medium) on which is stored the instructions 1124 embodying any one or more of the methodologies or functions described herein. The instructions 1124 may also reside, completely or at least partially, within the main memory 1104, within the processor 1102 (e.g., within the processor's cache memory), or both, during execution thereof by the machine 1100. Accordingly, the main memory 1104 and the processor 1102 may be considered as machine-readable media (e.g., tangible and/or non-transitory machine-readable media). The instructions 1124 may be transmitted or received over a network 1126 via the network interface device 1120. For example, the network interface device 1120 may communicate the instructions 1124 using any one or more transfer protocols (e.g., hypertext transfer protocol (HTTP)).

In some example embodiments, the machine 1100 may be a portable computing device, such as a smart phone or tablet computer, and have one or more additional input components (e.g., sensors or gauges). Examples of such additional input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions for execution by a machine (e.g., the machine 1100), such that the instructions, when executed by one or more processors of the machine (e.g., the processor 1102), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more tangible (e.g., non-transitory) data repositories in the form of a solid-state memory, an optical medium, a magnetic medium, or any suitable combination thereof.

Furthermore, the machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1124 may further be transmitted or received over a network 1126 using a transmission medium via the network interface device 1120 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores (or data storage) are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
 receiving, by a server, a copy of a digitally encoded lock mechanism used to lock a container before shipping to a recipient;
 storing, in data storage, the copy of the digitally encoded lock mechanism;
 receiving, by the server, a location signal for the container, the location signal providing a confirmation generated by the container that confirms the container is at a location associated with the recipient; and
 in response to the receiving the location signal confirming that the container is at the location associated with the recipient, triggering, by the server, relay of an access key to a recipient device of the recipient, the access key being used by the recipient device to unlock the container by the recipient.

2. The method of claim 1, wherein the confirmation is generated by the container based on location information of the recipient stored at the container matching a current location of the container.

3. The method of claim 1, wherein the container is unlocked in response to the access key matching the digitally encoded lock mechanism and the container being at the location associated with the recipient.

4. The method of claim 1, wherein the access key comprises a scannable code, an image, or a series of one or more dual-tone multi-frequency (DTMF) tones.

5. The method of claim 1, wherein the container is unlocked in response to the access key matching the digitally encoded lock mechanism, the container being at the location associated with the recipient, and a signal is received from the recipient device verifying a fingerprint of the recipient.

6. The method of claim 1, further comprising:
receiving, from the container, the access key provided by the recipient to the container;
in response to the receiving, performing an authentication process to determine whether to unlock the container, the performing comprising comparing the access key to the copy of the digitally encoded lock mechanism stored in the data storage; and
in response to determining to unlock the container, transmitting instructions to the container to unlock.

7. The method of claim 1, further comprising using a security component to verify the recipient or proper handling of the container, the security component comprising one or more of:
a camera used to capture an image of the recipient and provide the image to an authentication module having a facial recognition authentication process;
a weight scale to measure a weight of content when initially placed in the container and upon opening of the container by the recipient; or
an accelerometer or gyroscope to indicate if the container experienced a sudden stop in movement or shipped in a proper orientation.

8. The method of claim 1, wherein the container is unlocked in response to the access key matching the digitally encoded lock mechanism.

9. The method of claim 1, further comprising registering the recipient with the server, the registering comprising receiving the location associated with the recipient.

10. A system comprising:
one or more hardware processors; and
memory storing instructions that, when executed by the one or more hardware processors, cause the one or more hardware processors to perform operations comprising:
receiving a copy of a digitally encoded lock mechanism used to lock a container before shipping to a recipient;
storing, in data storage, the copy of the digitally encoded lock mechanism;
receiving a location signal for the container, the location signal providing a confirmation generated by the container that confirms the container is at a location associated with the recipient; and
in response to the receiving the location signal confirming that the container is at the location associated with the recipient, triggering relay of an access key to a recipient device of the recipient, the access key being used by the recipient device to unlock the container by the recipient.

11. The system of claim 10, wherein the confirmation is generated by the container based on location information of the recipient stored at the container matching a current location of the container.

12. The system of claim 10, wherein the access key comprises an image.

13. The system of claim 10, wherein the access key comprises a scannable code.

14. The system of claim 10, wherein the access key comprises a series of one or more dual-tone multi-frequency (DTMF) tones.

15. The system of claim 10, wherein the operations further comprise:
receiving, from the container, the access key provided by the recipient to the container;
in response to the receiving, performing an authentication process to determine whether to unlock the container, the performing comprising comparing the access key to the copy of the digitally encoded lock mechanism stored in the data storage; and
in response to determining to unlock the container, transmitting instructions to the container to unlock.

16. The system of claim 10, wherein the recipient device comprises an application installed thereon for receiving the access key.

17. The system of claim 10, wherein the access key comprises a copy of the digitally encoded lock mechanism and the container is unlocked in response to the access key matching the digitally encoded lock mechanism.

18. The system of claim 10, wherein the operations further comprise registering the recipient with a server, the registering comprising receiving the location associated with the recipient.

19. A non-transitory machine-readable medium storing instructions that, when executed by one or more hardware processors of a machine, cause the machine to perform operations comprising:
receiving a copy of a digitally encoded lock mechanism used to lock a container before shipping to a recipient;
storing, in data storage, the copy of the digitally encoded lock mechanism;
receiving a location signal for the container, the location signal providing a confirmation generated by the container that confirms the container is at a location associated with the recipient; and
in response to the receiving the location signal confirming that the container is at the location associated with the recipient, triggering relay of an access key to a recipient device of the recipient, the access key being used by the recipient device to unlock the container by the recipient.

20. The non-transitory machine-readable medium of claim 19, wherein the operations further comprise:
receiving, from the container, the access key provided by the recipient to the container;
in response to the receiving, performing an authentication process to determine whether to unlock the container, the performing comprising comparing the access key to the copy of the digitally encoded lock mechanism stored in the data storage; and
in response to determining to unlock the container, transmitting instructions to the container to unlock.

* * * * *